V. BOLIS.
Cultivator Plow.
No. 107,754.
Patented Sept. 27, 1870.
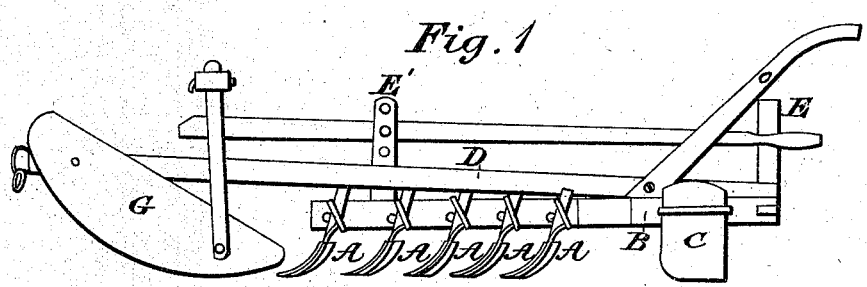
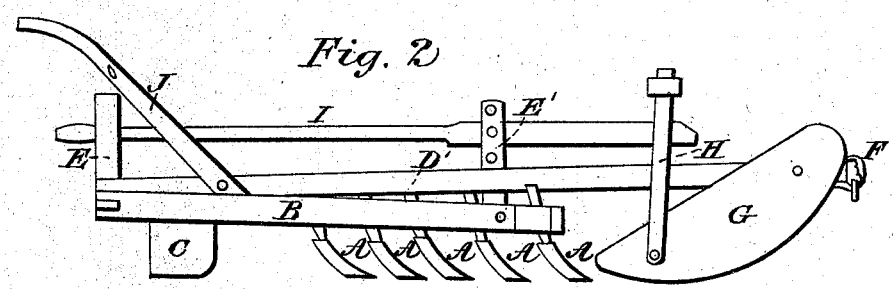

UNITED STATES PATENT OFFICE.

VICTOR BOLIS, OF ST. MARY'S PARISH, LOUISIANA.

IMPROVEMENT IN CULTIVATOR-PLOWS.

Specification forming part of Letters Patent No. 107,754, dated September 27, 1870.

*To all whom it may concern:*

Be it known that I, VICTOR BOLIS, of the parish of St. Mary's, State of Louisiana, have invented a certain Improvement in Plows, which I denominate the "hoe-plow," of which the following is a specification.

My invention has for its object to perform the work of the plow and of the hoe in the cultivation of agricultural products, but particularly those which are planted in rows several feet apart—such as sugar-cane and Indian corn—at one and the same time, and by one and the same implement.

My invention consists of a peculiarly-constructed frame on which is mounted a number of hoe-plows, by which I mean plows that are so formed that they will cut underneath the roots of grass, most kinds of field-weeds, and the like, and at the same time turn over the same with the thin slice of surface earth which is cut at the same time, the cutting being after the manner of a hoe and the turning over after the manner of a turning-plow, and also a wide thin cutter-blade placed in vertical position to serve as a cutter, and a rudder to steady the implement and keep it straight, in combination with two runners so arranged that through their agency and in virtue of their form, which may be said to represent half-sections of an ellipse, and a lever connected to them, the front end of the frame may be elevated or depressed at pleasure by the man who guides the implement at its rear end, and thus the penetration of the hoe-plows increased or diminished as the exigencies of the case may require, or the said hoe-plows be raised entirely off the ground whenever, in the movement of the implement, it is not desired to bring them into action; but my invention will be more quickly and better described by referring to the drawings.

A number of what I call my "hoe-plows," A, are secured, by means of their shanks and other suitable appliances, to the diagonal front bar of a frame, B, in such manner that all the mold-boards project in the same direction, and each hoe-plow will overlap the next behind it, so as to secure the covering of the whole ground, and thus prevent the leaving of any strip of grass in the track of the implement uncut, while at the same time diminishing the power required to operate the same. The inclination of the diagonal bar, to which the hoe-plows are secured, with reference to the longitudinal axis of the implement should be about thirty degrees.

Near the rear end of the short side of the frame B, I place a thin cutter-blade, C, in order to guide the implement and cut any small roots that may lie in its path. Above or on the frame B, I secure another frame, consisting, principally, of the two parallel bars D D', and cross-bars enough to hold these parallel bars together, or rather at a prescribed distance from each other. On one of these cross-bars I fix a short vertical standard, E, and on another a similar standard, E', excepting that the latter presents two parts in its upper sections, and therefore an opening between these parts, which occupies the line of the longitudinal axis of the frame D D'. The functions these standards perform will be explained presently. The bars D D' extend several feet in front of the extreme front end of the frame B, and are connected together by a cross-bar at their front ends, to which a clevis, F, or other suitable means for securing the draft horses or mules, is fastened, as shown.

Just behind the front cross-bar, to which I have just referred, an iron round bar passes through the bars D D', to the ends of which, the same projecting sufficiently outside the bars for the purpose, are secured the elliptical runners G G', as shown, near the front extremities of the latter. Near the rear extremities of these runners a yoke-frame, H, is pivoted in such manner that it straddles the bars D D'. The iron bar to which the runners are attached passes through the bars D D' loosely, so that said runners may be easily elevated or depressed at their rear extremities, and thus lift the front end of the implement or depress it, as circumstances may require, and in doing so adjust the measure of the penetration below the surface of the ground of the hoe-plows, or carry them up quite above the surface of the ground whenever it may be expedient to do so. A lever, I, passing through the opening in the standard E', wherein it is sustained by a fulcrum-pin, as seen at both figures, and connecting with the yoke-frame H, constitutes the means I employ for operating the runners G G' and accomplishing any of the purposes which they fulfill. The standard E enables me, by simply putting the lever on its top, to hold the runners down to the lowest point of depression to which it is ever necessary to carry them, or by a series of notches on its side, or a proper spring-catch, which are not shown on the drawings, to hold them in any position it is desirable to put them.

The handles J afford a means by which the man who manages the implement or machine has perfect control over its rear end, while the rear end of the lever I, extending behind the rear extremity of the frame, between the handles, does the same thing with respect to the runners G G'.

What I claim is—

The hoe-plows A, when mounted on a diagonal front bar of a frame, B, the said frame being provided with a cutter-blade, C, in combination with the frame consisting of the longitudinal bars D D', a sufficient number of cross-bars, and the standards E E', when said frame is provided with the adjusting elliptical runners G G', and these latter are operated by a yoke-frame, H, and a lever, I, and all the parts are constructed, arranged, and operate substantially as described, for the purpose set forth.

VICTOR BOLIS.

Witnesses:
A. TRASTOUR,
E. J. TRASTOUR.